US011685378B2

(12) United States Patent
Parks et al.

(10) Patent No.: US 11,685,378 B2
(45) Date of Patent: Jun. 27, 2023

(54) EXTRINSIC CHARACTERIZATION OF DETECTION CAPABILITY TO SUPPORT AUTOMATED LANE CHANGE

(71) Applicant: GM GLOBAL TECHNOLOGY OPERATIONS LLC, Detroit, MI (US)

(72) Inventors: Jeffrey S. Parks, Ann Arbor, MI (US); Paul A. Adam, Milford, MI (US); Namai P. Kumara, Ypsilanti, MI (US); Shaun C. Bowman, Ann Arbor, MI (US); Dmitriy Feldman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 17/066,265

(22) Filed: Oct. 8, 2020

(65) Prior Publication Data

US 2022/0111848 A1 Apr. 14, 2022

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2420/42* (2013.01); *B60W 2420/52* (2013.01); *B60W 2520/10* (2013.01); *B60W 2552/20* (2020.02)

(58) Field of Classification Search
CPC combination set(s) only.
See application file for complete search history.

(56) References Cited

U.S. PATENT DOCUMENTS

| | | | | |
|---|---|---|---|---|
| 10,183,668 | B2 * | 1/2019 | Takae | B60K 31/00 |
| 2018/0032081 | A1 * | 2/2018 | Etoh | G05D 1/0255 |
| 2019/0384302 | A1 * | 12/2019 | Silva | G05D 1/0248 |
| 2020/0139974 | A1 * | 5/2020 | Schreiber | G08G 1/167 |
| 2020/0231142 | A1 * | 7/2020 | Liu | G01C 21/28 |
| 2020/0249691 | A1 * | 8/2020 | Burca | B60R 11/04 |
| 2020/0284887 | A1 * | 9/2020 | Wachter | G01S 17/86 |
| 2020/0290618 | A1 * | 9/2020 | Conrad | B60W 30/162 |
| 2020/0290621 | A1 * | 9/2020 | Ji | H04W 4/027 |
| 2020/0331494 | A1 * | 10/2020 | Ando | B60W 60/001 |
| 2021/0010814 | A1 * | 1/2021 | Demir | G01S 13/89 |
| 2021/0063546 | A1 * | 3/2021 | Slobodyanyuk | G01S 17/86 |
| 2021/0191399 | A1 * | 6/2021 | Verghese | G06V 20/56 |
| 2021/0195112 | A1 * | 6/2021 | Verghese | G08G 1/048 |
| 2022/0264081 | A1 * | 8/2022 | Satoh | G01S 13/865 |

FOREIGN PATENT DOCUMENTS

WO WO-2021049790 A1 * 3/2021

* cited by examiner

*Primary Examiner* — Anne Marie Antonucci
*Assistant Examiner* — Amelia Vorce
(74) *Attorney, Agent, or Firm* — Cantor Colburn LLP

(57) ABSTRACT

An autonomous vehicle and a system and method of operating the autonomous vehicle. The system includes a sensor and a processor. The processor determines an effective observation area of the sensor, the effective observation area being affected by an extrinsic condition. The processor determines an available time for performing a lane change based on the effective observation area and performs the lane change based on the available time.

17 Claims, 7 Drawing Sheets

300
Q2
Q1
10
210c
210d
Q3
Q4
302
308
306
304

EXTRINSIC CHARACTERIZATION OF DETECTION CAPABILITY TO SUPPORT AUTOMATED LANE CHANGE

INTRODUCTION

The subject disclosure relates to autonomous vehicles and, in particular, to a system and method for determining a viable sensor range for making a lane change at the autonomous vehicle.

An autonomous vehicle performs various calculations when changing lanes. These calculations are based, in part, on detections or observations made using a sensor, such as a radar system or camera. The calculations assume that the field of view and/or range of the sensor is always at its maximum capacity. However, extrinsic conditions can reduce the field of view or range of the sensor. An extrinsic condition includes weather conditions, such as rain, fog, snow, dirty sensors, etc., obstructions due to objects on the road, and/or obstructions due to road terrain, such as hills. When the calculations do not account for the actual or impaired range of the sensor, a decision on whether to perform a lane change is based on incomplete knowledge of the vehicle's surroundings and is therefore not recommended. Accordingly, it is desirable to be able to make a lane change using calculations based on an actual range of the sensor that takes into account environmental impairments to the sensor.

SUMMARY

In one exemplary embodiment, a method of operating an autonomous vehicle is disclosed. An effective observation area of a sensor of the vehicle is determined, the effective observation area being affected by an extrinsic condition. An available time for performing a lane change is determined based on the effective observation area. The lane change is performed based on the available time.

In addition to one or more of the features described herein, the lane change is performed when the available time is greater than a time threshold for performing the lane change. In an embodiment, determining the effective observation area further includes expanding an effective range of the effective observation area when an object is detected by the sensor at a position outside of the effective range and/or reducing an effective range of the effective observation area when a detection is not made by the sensor within a selected time interval. The coefficient of sensor uncertainty for the sensor can be determined based on a ratio of an obstructed area in a field of view of the sensor and an optimal field of view for the sensor and determining an effective range based on the coefficient of sensor uncertainty and a calibration table. In another embodiment, an effective range of the effective observation area can be determined based on an elevation of a terrain. The effective range of the sensor can be determined using a plurality of processes and selecting a smallest effective range generated by the plurality of processes.

In another exemplary embodiment, a system for operating an autonomous vehicle is disclosed. The system includes a sensor and a processor. The processor is configured to determine an effective observation area of the sensor, the effective observation area being affected by an extrinsic condition, determine an available time for performing a lane change based on the effective observation area, and perform the lane change based on the available time.

In addition to one or more of the features described herein, the processor is further configured to perform the lane change when the available time is greater than a time threshold for performing the lane change. The processor is further configured to expand an effective range of the effective observation area when an object is detected by the sensor at a position outside of the effective range. The processor is further configured to reduce an effective range of the effective observation area when a detection is not made by the sensor within a selected time interval. The processor is further configured to determine a coefficient of sensor uncertainty for the sensor based on a ratio of an obstructed area in a field of view of the sensor and an optimal field of view for the sensor and determine an effective range based on the coefficient of sensor uncertainty and a calibration table. The processor is further configured to determine an effective range of the effective observation area based on an elevation of a terrain. The processor is further configured to determine the effective range of the sensor using a plurality of processes and select a smallest effective range generated by the plurality of processes.

In yet another exemplary embodiment, an autonomous vehicle is disclosed. The autonomous vehicle includes a sensor and a processor. The processor is configured to determine an effective observation area of the sensor, the effective observation area being affected by an extrinsic condition, determine an available time for performing a lane change based on the effective observation area, and perform the lane change based on the available time.

In addition to one or more of the features described herein, the processor is further configured to perform the lane change when the available time is greater than a time threshold for performing the lane change. The processor is further configured to expand an effective range of the effective observation area when an object is detected by the sensor at a position outside of the effective range. The processor is further configured to reduce an effective range of the effective observation area when a detection is not made by the sensor within a selected time interval, the effective range using a selected decay rate. The processor is further configured to determine a coefficient of sensor uncertainty for the sensor based on a ratio of an obstructed area in a field of view of the sensor and an optimal field of view for the sensor and determine an effective range based on the coefficient of sensor uncertainty and a calibration table. The processor is further configured to determine an effective range of the effective observation area based on an elevation of a terrain.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
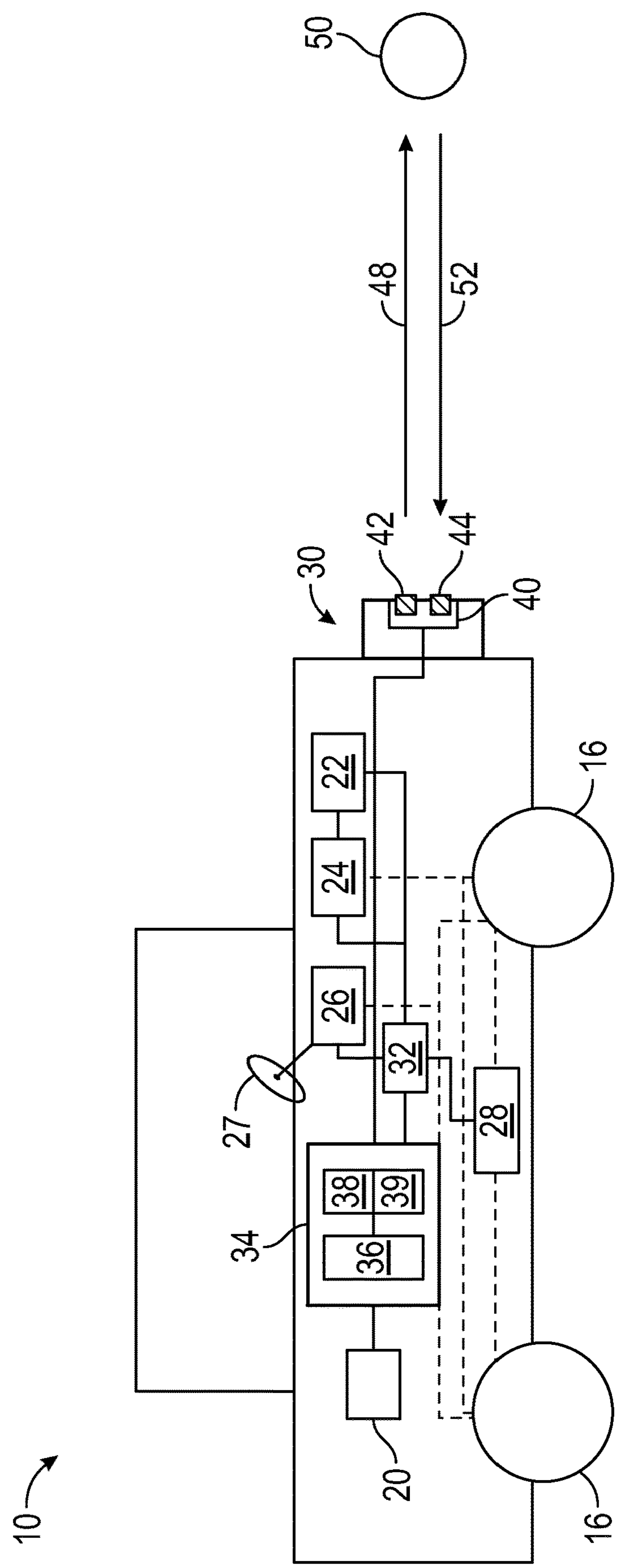
FIG. 1 shows an autonomous vehicle in an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of the levels 1 through 5.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and provides various parameters of the objects useful in locating the position and relative velocities of various remote vehicles in the environment of the autonomous vehicle. Such parameters can be provided to the controller 34. In operation, the transmitter 42 of the radar system 40 sends out a radio frequency (RF) reference signal 48 that is reflected back at the autonomous vehicle 10 by object 50 in the field of view of the radar system 40 as one or more reflected echo signals 52, which are received at receiver 44. The one or more echo signals 52 can be used to determine various parameters of the object 50, such as a range of the object, Doppler frequency or relative radial velocity of the object, and azimuth, etc. The sensor system 30 includes additional sensors, such as digital cameras, for identifying the object 50, road features, etc.

The controller 34 builds a trajectory for the autonomous vehicle 10 based on the output of sensing system 30. The controller 34 can provide the trajectory to the actuator system 32 to control the propulsion system 22, transmission system 24, steering system 26, and/or brake system 28 in order to navigate the autonomous vehicle 10 with respect to the object 50.

The controller 34 includes a processor 36 and a computer readable storage device or storage medium 38. The storage medium 38 includes programs or instructions 39 that, when executed by the processor 36, operate the autonomous vehicle 10 based on outputs of data from the sensor system 30. The storage medium 38 may further include programs or instructions 39 that when executed by the processor 36, determines a state of the object 50 in order to allow the autonomous vehicle 10 to drive with respect the object. The processor 36 can determine an effective range, scope, or limit of the sensor system 30, including the radar system and digital camera, in various extrinsic conditions, such as adverse weather conditions, road obstructions, obstructions due to terrain, etc. Navigational decisions for the autonomous vehicle 10 can be made based on the effective range of the sensor system 30 rather than on a specified or maximum range of the sensor system 30.

Figure 2:
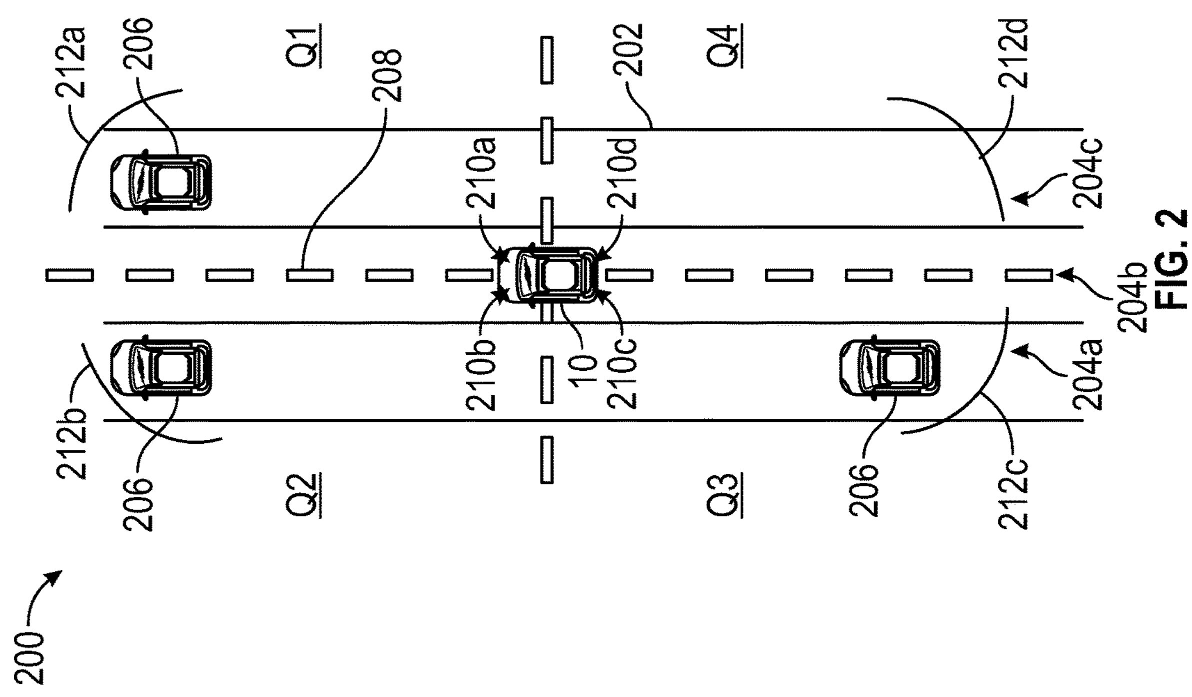
FIG. 2 is a top side view of the autonomous vehicle on a roadway including three lanes.

FIG. 2 is a top side view 200 of the autonomous vehicle 10 on a roadway 202 including three lanes, a left lane 204*a*, a middle lane 204*b* and a right lane 204*c*. The autonomous vehicle 10 is located in the middle lane 204*b*. Various target vehicles 206 are shown on the roadway 202 at various locations with respect to the autonomous vehicle 10. A grid 208 is defined with respect to the autonomous vehicle 10. The grid 208 separates a region or area surrounding the autonomous vehicle 10 into four sensor quadrants, with an origin of the grid 206 being centered at the autonomous vehicle 10. In an embodiment, the autonomous vehicle 10 has four sensors, with each sensor assigned to a quadrant. A first sensor 210*a* is assigned to the first quadrant (Q1, right front), a second sensor 210*b* is assigned to the second quadrant (Q2, left front), a third sensor 210*c* is assigned to the third quadrant (Q3, left rear), and a fourth sensor 210*d* is assigned to the fourth quadrant (Q4, right rear). Each sensor covers an area, where a boundary of the area of the sensor is indicated by at least one of a field of view of the sensor or a range of the area. When the operation of the sensor is impaired, an effective area of the sensor is indicated by at least one of an effective field of view of the sensor or an effective range of the area. Each sensor is aligned so that its field of view covers its assigned quadrant. Ranges 212*a*-212*d* indicate the maximum ranges achievable by the first, second, third and fourth sensors 210*a*-210*d*, respectively. A maximum range and/or maximum field of view is generally achieved in clear weather conditions and without obstructions to the sensor.

The autonomous vehicle 10 navigates traffic based on information obtained by the sensors, particularly with respect to target vehicles 208 and/or other objects within the field of view of a sensor. In various embodiments, the autonomous vehicle 10 uses information obtained by the sensors in order to perform a lane change. In the illustrated scenario of FIG. 2, the autonomous vehicle 210 obtains information from the first sensor 210*a* and fourth sensor 210*d* in order to determine the state of the right lane 204*c* and whether there are any target vehicles 208 that are in a position or have a relative speed that would make it unsafe for the autonomous vehicle 10 to change into the right lane 204c. In poor weather conditions (e.g., rain, fog, snow, dirty sensors), the effective range and/or effective field of view of the sensor can be limited or reduced from the maximum range and/or maximum field of view, thereby reducing the effectiveness of the sensor in providing information for a lane change.

The effective observation area of a sensor is quantified by an effective range (indicating an effective distance seen radially by the sensor) and an effective field of view (or effective angular range for the sensor). The effective range indicates a range at which an object is detected with a selected certainty by the sensor. The effective range is calculated quantity that can be affected by weather conditions, the presence of objects or terrain features, etc. Sensors make observations at periodically spaced intervals. The effective range can be recalculated or updated for each interval or when new information is obtained. The autonomous vehicle 10 decides whether to perform a lane change or other maneuver using the effective range to ensure safe lane changing. Different methods or processes for calculating an effective range are discussed with respect to FIGS. 3-7.

Figure 3:
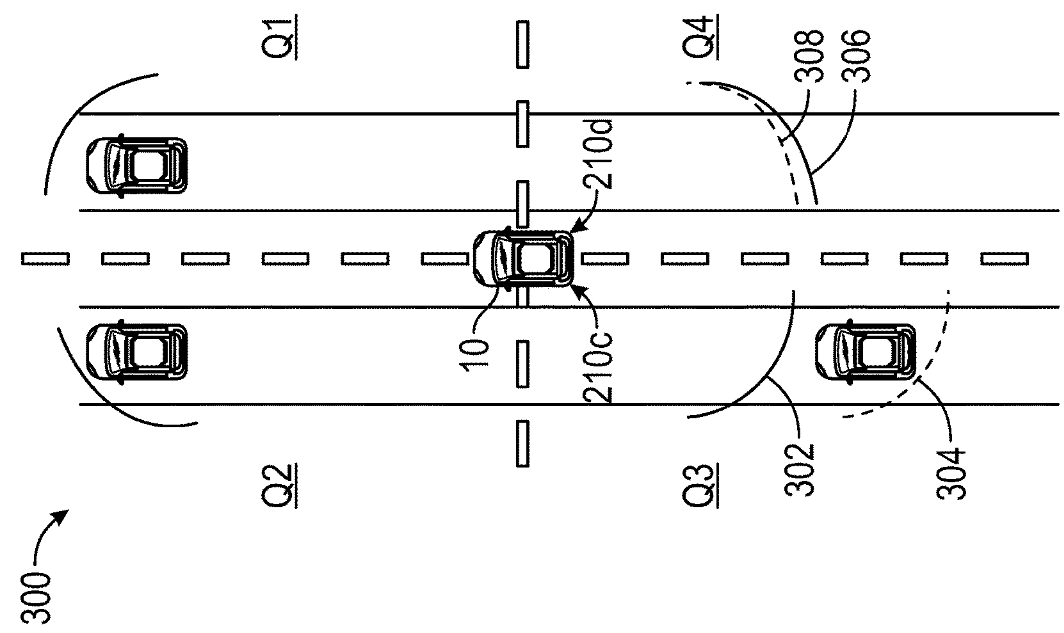
FIG. 3 shows a top side view of the autonomous vehicle illustrating a method of determining an effective range for a sensor of the vehicle.

FIG. 3 shows a top side view 300 of the autonomous vehicle 10, illustrating a method or process of determining an effective range for a sensor, in an embodiment. Quadrant 3 and quadrant 4 are referred to for illustrative purposes. A process of expanding an effective range of a sensor is illustrated in quadrant 3. A process of reducing an effective range of a sensor is illustrated in quadrant 4.

Referring first to quadrant 3, a first effective range for sensor 210c is shown by first range marker 302. The first effective range is based on current calculations using a sensor observation over a time interval, the sensor observation being affected by weather conditions, etc. At a subsequent time interval in which the weather conditions have changed, for example, sensor 210c can detect an object at a greater distance than the first range marker 302. When an object is detected at this increased distance, the effective range is relocated to a second effective range indicated by second range marker 304. The second range marker 304 can be relocated to a most distal extent of the object or can be a maximal range of the sensor.

Referring now to quadrant 4, the effective range of the sensor associated with quadrant 4 is shown at a first effective range indicated by third range marker 306. When the sensor does not detect an object within a time interval, the effective range can be reduced from to a second effective range indicated by fourth range marker 308, where the fourth range marker is closer to the autonomous vehicle 10 than the third range marker 310. The extent by which the effective range is reduced is defined by predefined decay rate. Once the effective range is at or below a minimum threshold, the effective range is held constant if there is not detected object within a time interval.

Figure 4:
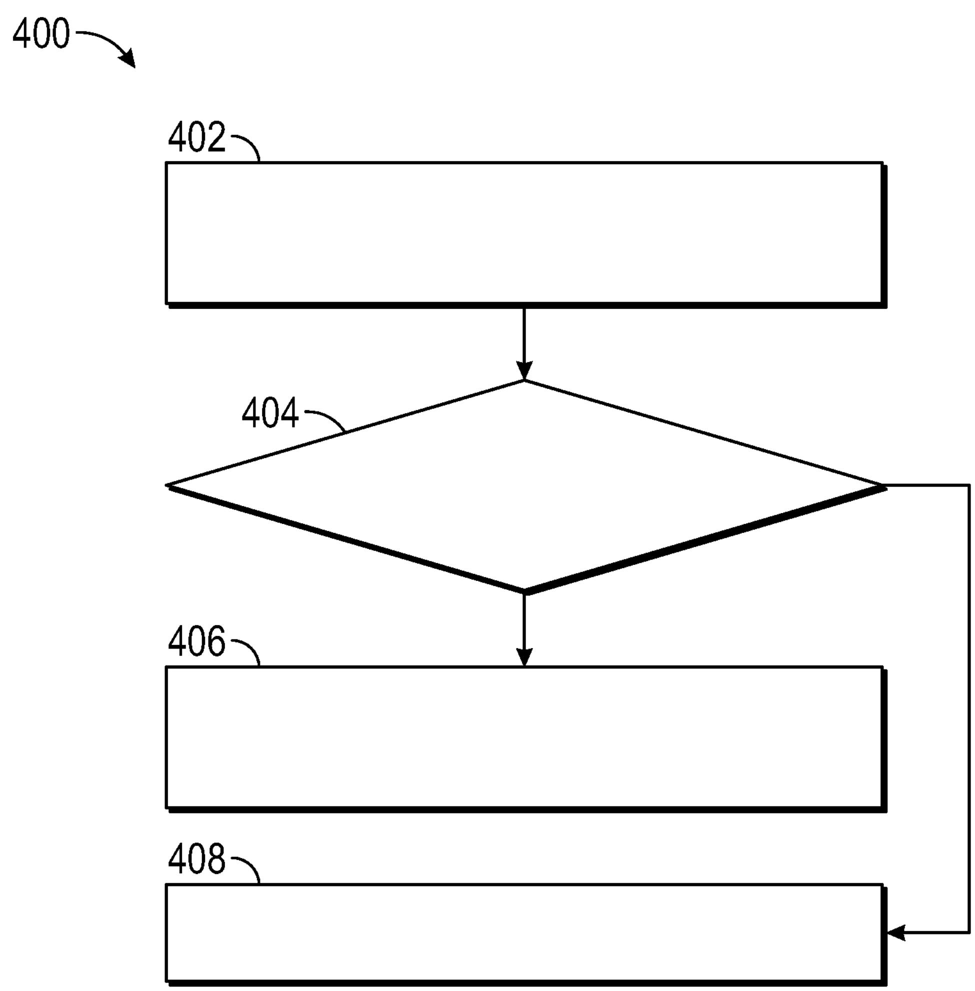
FIG. 4 shows a flowchart illustrating a method for expanding an effective range of a sensor.

FIG. 4 shows a flowchart 400 illustrating a method or process for expanding the effective range of a sensor, as illustrated in quadrant 3 of FIG. 3. In box 402, an observation is made by the sensor, the observation including a detection of an object that is beyond the current effective range of the sensor. In box 404, a processor determines whether the detection meets various time and confidence thresholds that indicated that the detection is a valid detection. If the detection is valid, then in box 406 the effective range is expanded to a greater distance from the autonomous vehicle 10. If the detection is not valid, then at box 408 the effective range is maintained at its current distance.

Figure 5:
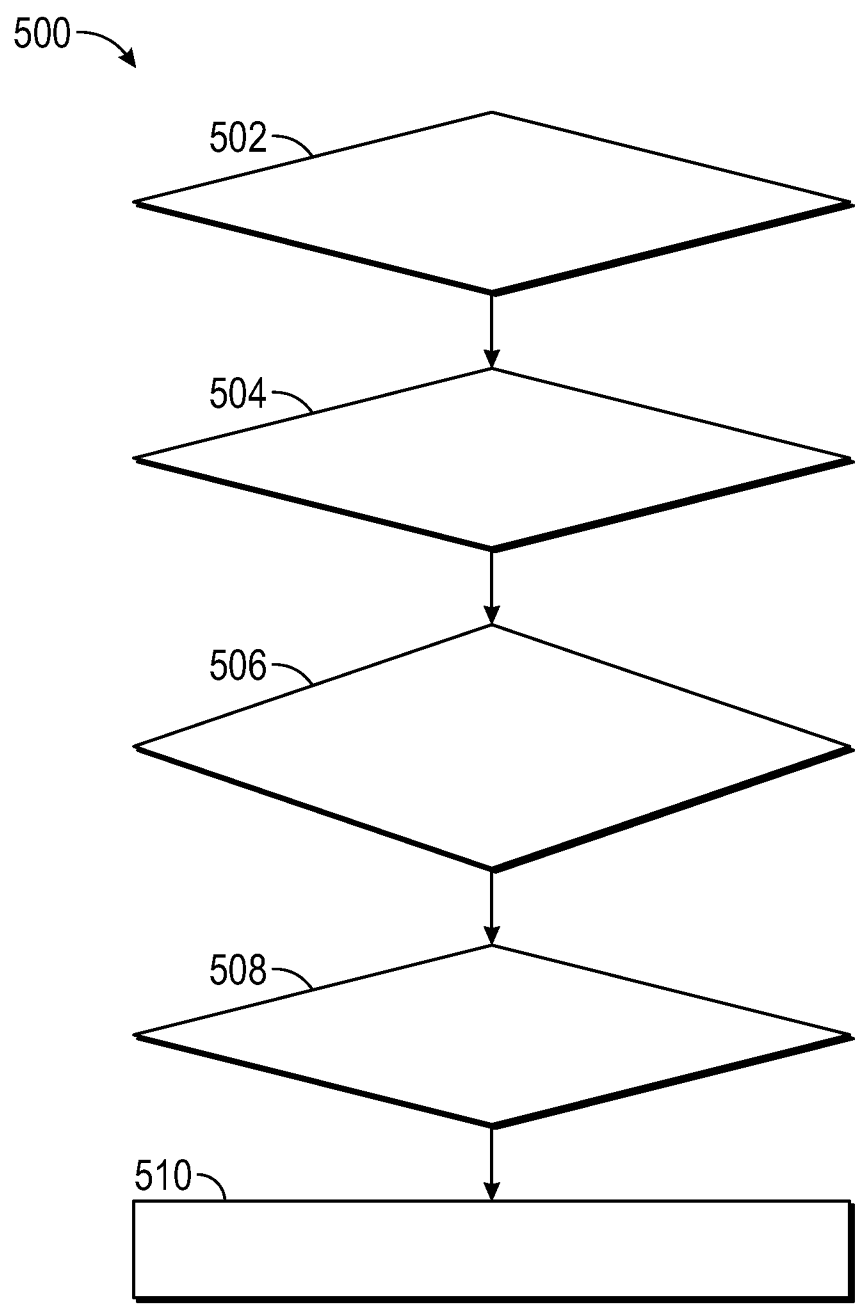
FIG. 5 shows a flowchart illustrating a method for reducing the effective range of the sensor.

FIG. 5 shows a flowchart 500 illustrating a method or process for reducing the effective range of the sensor, as illustrated in quadrant 4 of FIG. 3. In box 502, an observation made by a sensor is reviewed in order to determine whether an object has been detected by the sensor. If no object has been detected, then in box 504, the processor determines whether an automated lane change is in progress. If an automated lane change is not in progress, then in box 506 the processor determines whether the lane heading for the automated vehicle is within a selected criterion with respect to a center line of the road. If the lane heading is within the selected criterion, then in box 508, the processor determines if the effective range is at or less than a selected lower limit (i.e., minimum threshold) for the effective range. If the effective range is greater than the lower limit, then in box 510 the effective range is reduced.

Figure 6:
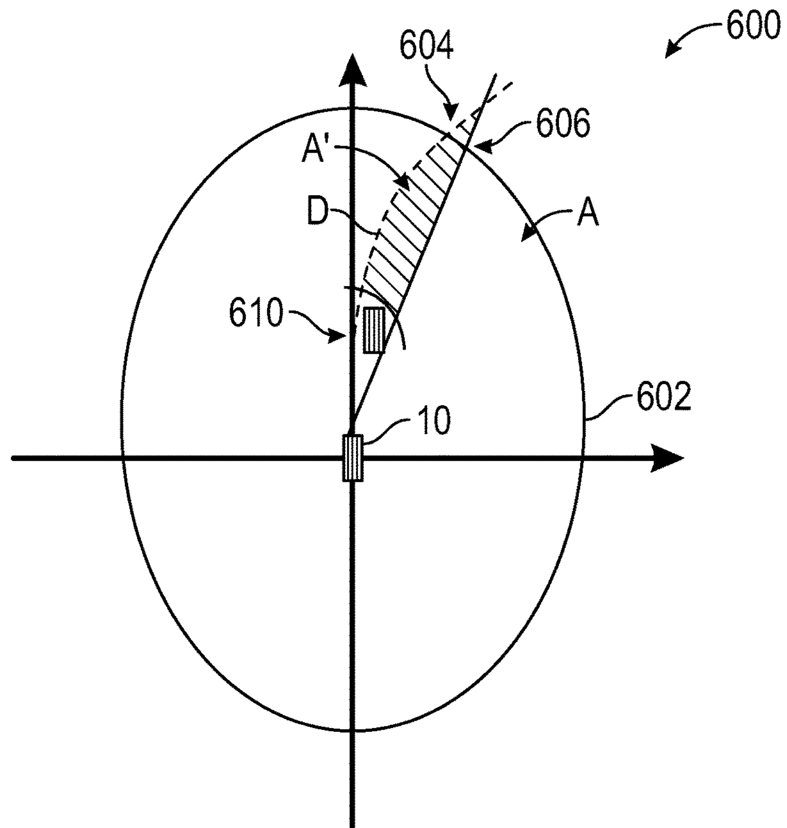
FIG. 6 shows a top view of the autonomous vehicle illustrating the effect of an object on a field of view of the sensor.

FIG. 6 shows a top view 600 of the autonomous vehicle 10 illustrating the effect of an object 610 on a field of view of a sensor. A total field of view for all sensors of the autonomous vehicle 10 is shown by the ellipse 602. For the first sensors 210a, FIG. 2, the field of view is the first quadrant Q1. The area of the optimal field of view in the first quadrant is A. The autonomous vehicle 10 is traveling along a curved road 604. An object 610 is shown in the first quadrant Q1 for illustrative purposes. The object 610 obstructs a view of the right lane along a line of sight 606. An obstructed region D caused by the object 610 and the curved road 640 has area A'. The area A' can be determined by an integration over the obstructed region D, as shown in Eq. (1):

$$A' = \iint_D dA \qquad \text{Eq. (1)}$$

Once the area i of the obstructed region is determined, a coefficient of sensing uncertainty $K_{SM}$ can be determined for the sensor by forming a ratio of the optimal field of view A to the area A' of the obstructed region, as shown in Eq. (2):

$$K_{su} = \frac{A}{A'} \qquad \text{Eq. (2)}$$

When A'=0, a positive lower limit to A' can be used in Eq. (2) to prevent divide-by-zero errors. As the area A' of the obstructed region decreases, the value of the coefficient of sensing uncertainty increases. Therefore, an unobstructed quadrant has a high coefficient of sensing uncertainty and a quadrant with many obstructions has a low coefficient of sensing uncertainty.

Coefficients of sensing uncertainty can be calculated for each quadrant. The coefficients can be compared to a selected safety threshold in order to decide on whether a lane change is a viable option. When the coefficients of sensing uncertainty from each quadrant are greater than or equal to a safety threshold, the decision can be made that a lane change can be performed safely and the autonomous vehicle therefore makes a lane change. The coefficient of sensing uncertainty can be translated into an effective range of the sensor based on a calibration lookup table or by any other suitable method.

Figure 7:
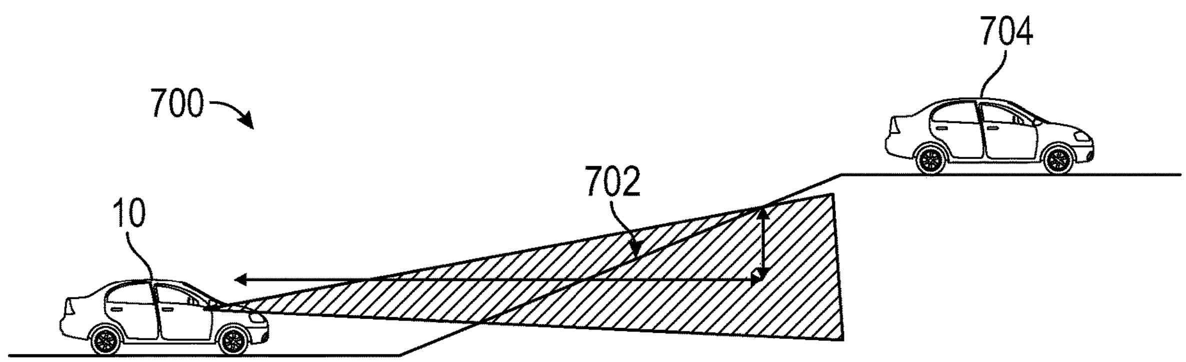
FIG. 7 shows a side view of the autonomous vehicle on a non-level terrain.

FIG. 7 shows a side view 700 of the autonomous vehicle 10 on a non-level terrain. The terrain has a hill 702 which obstructs the range of a forward-looking sensor, such as first sensor 210a and/or second sensor 210b, FIG. 2. The autonomous vehicle 10 is located at a bottom of the hill 720 and a target vehicle 704 is located at a top of the hill. The target vehicle 702 can therefore be close enough to the autonomous vehicle 10 to make a lane change undesirable for the autonomous vehicle 10, while the autonomous vehicle 10 is unaware of this situation. In order to determine an effective range of the sensor, the elevation change can be determined by sensor measurements or by reference to a topological map. An angle of elevation of the terrain can be determined for the hill 702 given the location of the autonomous vehicle 10 with respect to the hill 702. The effective range of the sensor can then be calculated from the elevation, as shown in Eq. (3):

$$\text{Effective range} = \frac{\text{elevation}}{\tan\theta} \qquad \text{Eq. (3)}$$

In various embodiments, the effective range of the sensor can be determined using any or all of the processes disclosed herein. When multiple processes are employed, the smallest effective range generated by the multiple processes can be selected for future processing and navigation of the autonomous vehicle 10.

Figure 8:
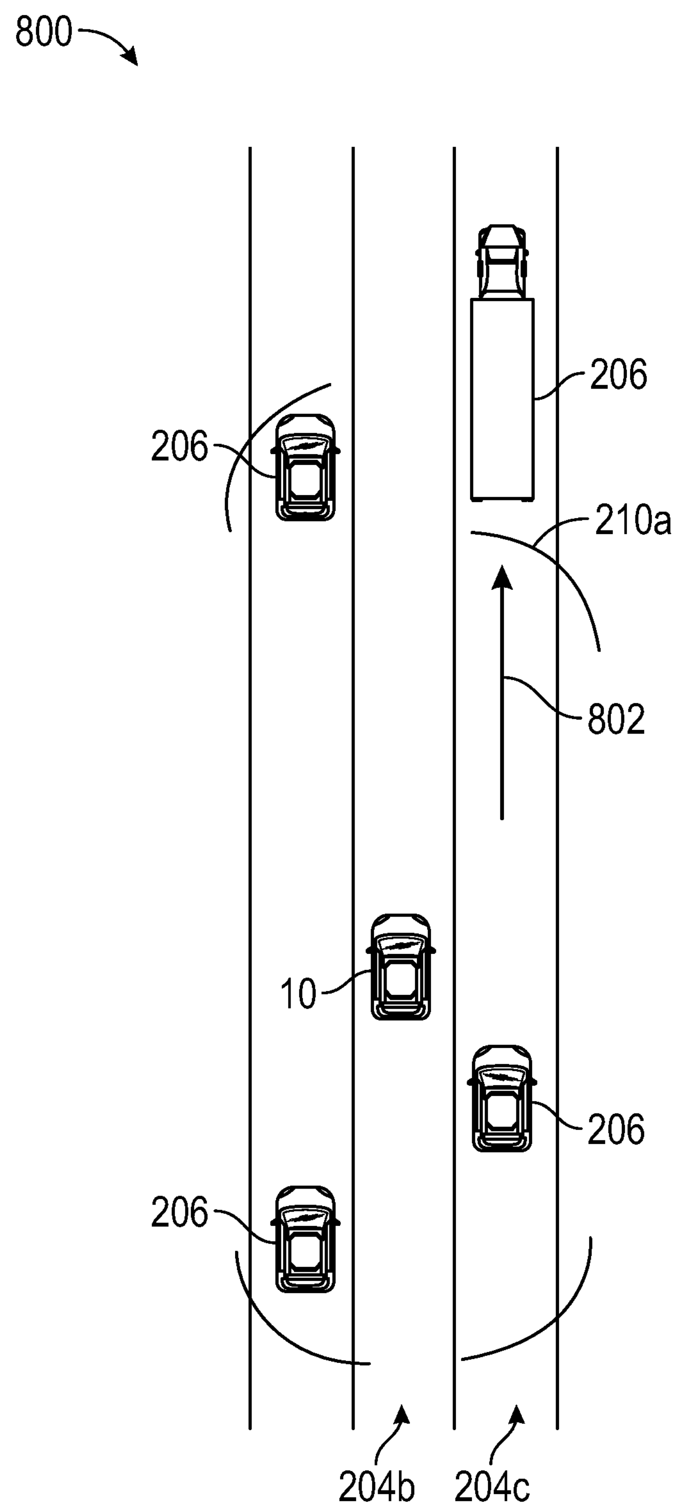
FIG. 8 shows a roadway section illustrating a scenario in which the autonomous vehicle makes a lane change.

FIG. 8 shows a roadway section 800 illustrating a scenario in which the autonomous vehicle 10 makes a lane change into a right lane of a roadway. The autonomous vehicle 10 is in the middle lane 204*b* and is deciding whether to move into the right lane 240*c*. The effective range 210*a* of the right front sensor is shown and there are no objects within the effective range. The decision-making process for making a lane change into the right lane is discussed with respect to FIG. 9.

Figure 9:
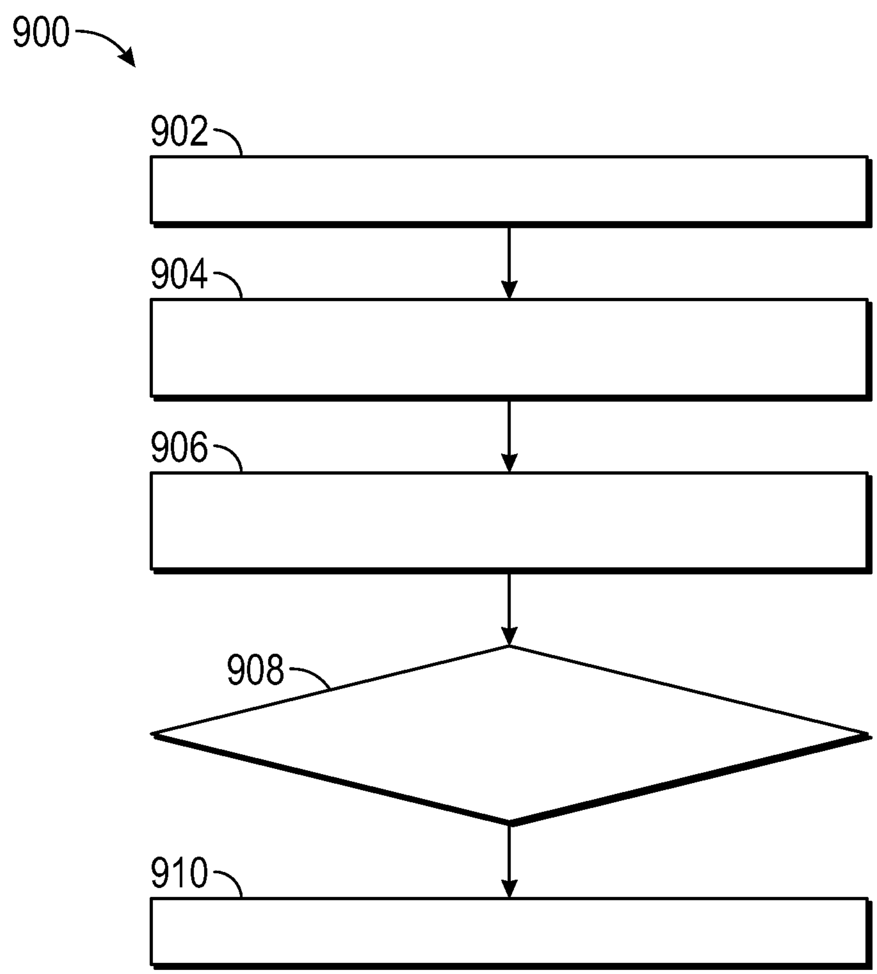
FIG. 9 shows a flowchart illustrating a method of making the illustrative lane change of FIG. 8 using data obtained via a sensor under certain extrinsic conditions.

FIG. 9 shows a flowchart 900 illustrating a method of making the illustrative lane change of FIG. 8 using data obtained via a sensor under certain extrinsic conditions. In box 902, an effective range for the right front sensor is determined, the effective range not including an object. In box 904, a right front clear time corresponding to the effective range is determined. The right front clear time can be based on the effective range for the right front sensor and the current velocity of the autonomous vehicle 10 and indicates how much time is available to make the lane change given the effective range. In box 906, a time threshold is looked up in a table, the time threshold indicating a time needed to make a safe lane change to a right lane. In box 908 the right front clear time is compared to the time threshold. If the right front clear time is greater than the time threshold, then in box 910, the autonomous vehicle 10 performs a lane change into the right lane.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating an autonomous vehicle, comprising:

operating a sensor to obtain a detection over an effective observation area, wherein the sensor is operated at a first effective range;

reducing the first effective range to a second effective range less than the first effective range when no detection is made in the observation area by the sensor within a selected time interval;

determining an available time for performing a lane change based on the second effective range; and performing the lane change based on the available time.

2. The method of claim 1, further comprising performing the lane change when the available time is greater than a time threshold for performing the lane change.

3. The method of claim 1, further comprising expanding the first effective range to a third effective range greater than the first effective range when an object is detected by the sensor at a position outside of the first effective range.

4. The method of claim 1, further comprising determining a coefficient of sensor uncertainty for the sensor based on a ratio of an obstructed area in a field of view of the sensor and an optimal field of view for the sensor and determining the second effective range based on the coefficient of sensor uncertainty and a calibration table.

5. The method of claim 1, further comprising determining the second effective range of the effective observation area based on an elevation of a terrain.

6. The method of claim 1, further comprising determining the second effective range of the sensor using a plurality of processes and selecting a smallest effective range generated by the plurality of processes.

7. A system for operating an autonomous vehicle, comprising:

a sensor for obtaining a detection over an effective observation area, the sensor operating at a first effective range; and a processor configured to:

reduce the first effective range to a second effective range less than the first effective range when no detection is made in the observation area by the sensor within a selected time interval;

determine an available time for performing a lane change based on the effective observation area; and perform the lane change based on the available time.

8. The system of claim 7, wherein the processor is further configured to perform the lane change when the available time is greater than a time threshold for performing the lane change.

9. The system of claim 7, wherein the processor is further configured to expand the first effective range to a third effective range greater than the first effective range when an object is detected by the sensor at a position outside of the first effective range.

10. The system of claim 7, wherein the processor is further configured to determine a coefficient of sensor uncertainty for the sensor based on a ratio of an obstructed area in a field of view of the sensor and an optimal field of view for the sensor and determine the second effective range based on the coefficient of sensor uncertainty and a calibration table.

11. The system of claim 7, wherein the processor is further configured to determine the second effective range of the effective observation area based on an elevation of a terrain.

12. The system of claim 7, wherein the processor is further configured to determine the second effective range of the sensor using a plurality of processes and select a smallest effective range generated by the plurality of processes.

13. An autonomous vehicle, comprising:

a sensor for obtaining a detection over an effective observation area, the sensor operating at a first effective range; and a processor configured to:

reduce the first effective range to a second effective range less than the first effective range when no detection is made in the observation area by the sensor within a selected time interval;

determine an available time for performing a lane change based on the effective observation area; and perform the lane change based on the available time.

14. The autonomous vehicle of claim 13, wherein the processor is further configured to perform the lane change when the available time is greater than a time threshold for performing the lane change.

15. The autonomous vehicle of claim 13, wherein the processor is further configured to expand the first effective range to a third effective range greater than the first effective range when an object is detected by the sensor at a position outside of the first effective range.

16. The autonomous vehicle of claim 13, wherein the processor is further configured to determine a coefficient of sensor uncertainty for the sensor based on a ratio of an obstructed area in a field of view of the sensor and an optimal field of view for the sensor and determine the second effective range based on the coefficient of sensor uncertainty and a calibration table.

17. The autonomous vehicle of claim 13, wherein the processor is further configured to determine the second effective range of the effective observation area based on an elevation of a terrain.

* * * * *